(12) United States Patent
Lo et al.

(10) Patent No.: US 6,819,014 B2
(45) Date of Patent: Nov. 16, 2004

(54) TWO-WIRE POWER SWITCH WITH LINE-POWERED SWITCH CONTROLLING MEANS

(75) Inventors: Chung Ping Kevin Lo, Kwai Chung (HK); Hui Yu, Kwai Chung (HK)

(73) Assignee: Clipsal Asia Holdings Limited, Hong Kong (HK)

( * ) Notice: Subject to any disclaimer, the term of this patent is extended or adjusted under 35 U.S.C. 154(b) by 406 days.

(21) Appl. No.: 10/102,804

(22) Filed: Mar. 22, 2002

(65) Prior Publication Data

US 2003/0160517 A1 Aug. 28, 2003

(30) Foreign Application Priority Data

Feb. 27, 2002 (HK) ............................................. 02101525

(51) Int. Cl.[7] .................................................. H01H 9/54
(52) U.S. Cl. ...................................................... 307/140
(58) Field of Search ................................. 307/140, 125

(56) References Cited

U.S. PATENT DOCUMENTS

| | | | |
|---|---|---|---|
| 4,678,985 A | 7/1987 | Moskin | |
| 4,713,598 A | 12/1987 | Smith | |
| 5,831,349 A | 11/1998 | Weng | |
| 6,522,249 B1 * | 2/2003 | Lonigro et al. | 340/533 |
| 6,700,333 B1 * | 3/2004 | Hirshi et al. | 315/291 |

* cited by examiner

Primary Examiner—Gregory J. Toatley, Jr.
(74) Attorney, Agent, or Firm—Burns, Doane, Swecker & Mathis, L.L.P.

(57) ABSTRACT

This invention relates to an electrical power switch which is a two-terminal electrical power switch having a line-powered switching control mechanism. The electrical power switch is provided with first and second shunt circuits between the terminals of the power outlet. This switch for power to operate through the outlet is included in a first shunt circuit that also contains a power supply operating from current flowing through the switch when in the "ON" condition. This first power supply can power a control means to control the operative state of the switch while current flows through. When the switch is in the "OFF" state, a second power supply contained in a second shunt circuit provides power to the control means.

14 Claims, 9 Drawing Sheets

TWO-WIRE POWER SWITCH WITH LINE-POWERED SWITCH CONTROLLING MEANS

FIELD OF INVENTION

The present invention relates to electrical power switches and, more particularly, to electrical power switches including line-powered switching control means. More specifically, this invention relates to a remote controllable two-terminal AC electrical power switch including a line-powered switching control means. Yet more specifically, although not solely limiting thereto, this invention also relates to retro-fittable two-terminal wall-mountable power switch including line-powered remote-controllable switching control means. This invention also relates to circuit arrangements for switching on and off an electrical load by line-powered automated switching control means.

BACKGROUND OF THE INVENTION

An electrical power switch is generally connected in series between a load and a power source in order to connect or disconnect (switch on or off) a load from an alternating current (AC) power source. When the switch is in the "ON" state, a generally low impedance appears between the terminals of the switch and electrical power will flow from the power source, for example, the AC mains, to the load. On the other hand, when the switch is in the "OFF" state, a very high impedance will generally appear across the terminals of the switch, thereby preventing or blocking the flow of electrical energy from the power source to the load.

A conventional two-terminal power switch generally includes a conductive contact switching member which is pivotable or movable between an "ON" and an "OFF" position corresponding respectively to the connection and or disconnection of the two terminals of the switch by the metallic conductive member.

Electronic switching devices such as power MOSFETS, transistors or thyristors are commonly used as switching means in electronic controlled electrical power switches since switching can be done without physically moving the conductive metallic member as in the case of conventional switches. However, the ON-state voltage drop across such devices is usually large and generates waste heat which causes heat dissipation problems, especially when the switch is enclosed in a small confined space, such as inside a wall socket.

Electro-mechanical switches such as relays which include a moveable conductive member connected to a magnetic core and coupled to a solenoid are also found in present day automated electrical power switches. However, conventional relay switches are usually bulky and require a continuous current to maintain a switching state. Such a continuous current causes heat dissipation problems as well as power supply problems. Electronic or electromechanical switching devices are particularly attractive nowadays because they can be used in soft-touch or automated switching schemes such as remote-control switching, motion-sensored or other detection-based power switching systems.

While soft-touch or automated switching schemes are generally preferred, such preferred switching schemes or devices generally require automated control and switching circuitry for controlling and/or effecting the actual switching. In addition, a power switch which is remotely controllable will provide great convenience to the public. However, such automated or remote controllable switching schemes generally require a power supply, usually a DC source but not necessarily limiting thereto, to operate the control and automated switching circuitry or the signal receivers.

For a three-wire AC wiring system, in which the live, neutral and earth terminals are available, the control or switching circuitry operating power may be obtained by connecting a power supply circuit between the "live" and the neutral or earth terminals. However, for a two-wire AC wiring system, in which the live or phase wire is connected through via a switching device, no neutral or earth terminals are available and the operating power supply may be obtained from an external power supply or directly from the AC power source. In the latter case, although the operating power may be obtained from the live wire alone or by additional wirings to the power source, this will usually involve additional wiring works which may be expensive and unsightly.

Obviously, it will be advantageous if the power supply to the control circuitry can be obtained directly from the live wire of the power source to which the switch is connected without requiring a separate power supply or additional wirings.

Where a power switch is used in location-fixed applications in a 2-wire environment, for example, for installation as a wall-mount power switch in a prewired wall socket, it may not be economical or practical to provide additional wirings to supply the necessary power. For such applications, an external power source will be inevitable unless the control and switching circuitry is line-powered. However, an external power supply usually means additional running costs as well as a more bulky and unsightly switching device.

Hence, it will be greatly advantageous if there can be provided switching devices or circuit arrangements in which the control or other peripheral circuitries can obtain their operating power from the live wire of the AC power source to which the switch is to be connected. However, since a power switch is usually connected in series with a load and between the two poles of an AC power source, the problems of getting line power to control switching are well known. In particular, a power switch is generally characterized by a high open-circuit voltage and a very low open-circuit leakage current when the switch is in the "OFF" state. At the same time, the switch is generally characterized by a low close-circuit voltage and a high close-circuit current across its two-terminals when the switch is on the "ON" state. Because of these inherent characteristics, problems exist for supplying operating power to the controlling and switching circuitries during both the "ON" and "OFF" state of a switch. Therefore, it will be advantageous if a two terminal power switch with line-powered switching and controlling circuitry (including remote-control circuitry) or circuit arrangements can be provided without undue complexity and in a sufficiently compact form.

In providing such line-powered circuitry or circuit arrangements, it will be highly advantageous if the additional on-state voltage drop across the terminals of the switch and the additional off-state leakage current due to the power supply to the control circuitry and the switching devices can be maintained to a minimum. A low off-state leaking current of less than 20 mA is generally required while a low on-state voltage drop is preferred since the product of the current and the voltage drop generally correlates to the power dissipation by the power switch itself.

In many conventional automated power switching circuitry, triacs or thyristors are usually utilized to facilitate electronic or non-contact power switching. Because of the inherent forward voltage drop of triacs or thyristors, power dissipation becomes significant and heat sinking requirements become critical. In higher current applications where a power switch is enclosed in a small and confined space during normal operation, for example, in a wall socket or cavity in case of a wall mounted power switch, triac or thyristor based switching devices may not be suitable due to the need of forced ventilation.

Hence, it will be of great advantage if there can be provided non-triac- or non-thyristor- based switching devices for use with the afore-described line-powered switching control circuitry to facilitate electronically controlled power switching while alleviating power dissipation problems associated with triac- or thyristor- based switching devices.

Furthermore, although electromechanical relay switches having a coil and a pair of normally open contacts have been proposed for use as switching devices in automated power switches, such relay switches have not been widely used in such power switches because a constant supply of DC current is generally required to maintain the mechanical conductive contacts in the closed positions. Such a DC current demand invariably means the need of a large current transformer in order to feed sufficient energy to the coil to maintain the closed positions. As a result, larger overall switch size as well as higher power dissipation become an issue. Therefore it will be desirable if improved switching devices can be proposed for use in automated power switches so that the demand of such DC current supply can be alleviated.

To enhance the applications or usefulness of the automated power switches and to improve user friendliness, it will be highly advantageous if such line-powered automated power switches can be controlled both locally or proximally at the physical location of the switch as well as remotely by, for example, radio-frequency or infrared control, motion, temperature, light or other sensor triggered switching schemes. In addition, the locally accessible control of such power switches usually includes a soft-touch toggle switching option so that only minimum physical effort is required for switching on or off the power switch. However, due to the somewhat effortless triggering of a soft-touch switch, the switch will be continuously and repeatedly turned on and turned off ("toggling") if the soft-touch button is kept pressed. This may be due to undesirable, mischievous or non-intentional switching such as prolonged pressing of the soft-touch button by a toddler or due to other un-intended false engagement of the switch. Hence, it will be highly desirable if the soft-touch control section is provided with means to neglect or discern such accidental, mischievous or un-intentional prolonged pressing of the soft-touch button.

OBJECT OF THE INVENTION

In view of the afore-said, it will be beneficial for the public if electrical power switches with line-powered controlling and/or switching control circuitry which improve, alleviate or overcome shortcomings associated with switches of this type are provided. In light of the known problems associated with the open- and closed-circuit voltage and current characteristics of typical power switches, it will be greatly advantageous if there can be provided power switches with built-in power supply so that power for operating the control or switching circuitry and devices is available irrespective of the switching state of the switch.

Accordingly, it is an object of the present invention to provide AC electrical switches having line-powered switching control circuitry or circuit arrangements in which the switching device is generally non-triac or thyristor based. It is another object of the present invention that such line-powered automated electrical switches do not require a large DC current to maintain the switching device in its on- or off-states or to change the switching states. It is yet another object of this invention to provide a power switch in which the switching device is sufficiently compact, easy to actuate while providing adequate switching performance.

It is yet an other object of the present invention to provide electrical switches with line-powered control circuitry and "soft-touch" switching facility which is also provided with means to neglect mischievous or undesirable switching action such as prolonged pressing of the soft-touched button for local switching. It will be highly desirable if the aforesaid objects can be implemented without compromising the benefit, safety and compactness of the power switches.

To provide additional convenience to the public, it is also an object of the present invention to provide power switches with line-powered controlling and switching circuitry which are remotely controllable. Preferably, such a remotely controllable power switch includes an option of being locally controllable at the physical location of the power switch.

It is also an additional object of the present invention to provide alternative circuit arrangements or topologies for use with line-powered controllable switches, whether in combination or separately, to alleviate problems with or to provide improvements to conventional switches.

As a minimum, it is an object of the present invention to provide the public with a choice of electrical power switches having line-powered control and/or switching circuitry or circuit arrangements for enhanced power switching control.

SUMMARY OF THE INVENTION

According to the present invention, there is provided an electrical power switch which includes:

a first and a second shunt circuit branches connected between said terminals, a switching means in said fist shunt branch, a control means for switching said switching means between a conductive "ON" state and a substantially non-conductive "OFF" state, a first and a second power supply circuits for supplying power to said control means respectively when said switching means is in the "ON" or the "OFF" state, said first power supply circuit includes a two-terminal circuit member which is connected in series with said switching means such that the same electric current will flow across both said switching means and said two-terminal member of said first power supply circuit, said second power supply circuit is connected in said second circuit branch, said control means includes means to generate electrical signals for switching said switching means to the "ON" or "OFF" states.

According to the general scope of the present invention, there is provided an electrical power switch including a first terminal, a second terminal, a switching device connecting said first and said second terminals, switching control means for operating and controlling said switching device, and power supply circuitry connected to said first and said second terminals for supplying power to said switching control means, wherein said switching device includes a solenoid operated contact switching member, said contact switching member being movable between a circuit-closing position (the "ON" position) and a circuit-opening position (the "OFF" position), said contact switching member remains in either said circuit-closing or said circuit-opening positions unless and until a switching current is sent through said solenoid to switch said contact switching member from said circuit-closing position ("ON" position) to said circuit-opening ("OFF") position or from said circuit-opening ("OFF") position to said circuit-closing ("ON") position.

In general, said switching current to switch said contact switching member from said "OFF" position to said "ON" position has a direction or polarity which is opposite to that for switching said contact switching member from said "ON" position to said "OFF" position.

Preferably, said contact switching member is held in said "ON" position by a magnetic core after a switching current of a first direction or polarity has been sent through said solenoid to magnetise said magnetic core.

Preferably, the energy required to switch said contact switching member from said "ON" position to said "OFF" position is lesser than that required to switch said contact switching member from said "OFF" to said "ON" position.

Preferably, said solenoid is connected to said switching control means via latching circuitry, said latching circuitry includes a first switched circuit branch connected to a first voltage source for switching "ON" said switching device and a second switched circuit branch connected to a second voltage source, for switching off said switching device, the voltage of said first voltage source being higher than that of said second voltage source.

Preferably, said contact switching member is moved against spring urge when moving from said "OFF" position to said "ON" position and said contact switching member moves with spring assistance when moving from said "ON" position to said "OFF" position.

Preferably, said switching control means sends currents of opposition directions or polarities through said solenoid for switching on and off said switching device.

Preferably, said switching control means is connected to a signal receiver for receiving remote control signals, said signal receiver is operated by power obtained from said power supply circuitry.

Preferably, said switching control means is connected to a local control and a remote control receiver, said switching control means sends out signals to operate said switching device upon detection of switching demand signals from either said local control or said remote control.

Preferably, said switching control means is connected to at least a first and a second switching signal sensors which hare conjunctively connected, said switching control means sends out switching signals to operate said switching device upon detection of a switching demand signal from any of said sensors.

Preferably, said contact switching member is brought into the "ON" position by magnetising a magnetic core which hold said contact switching member in its "ON" position by the residual magnetic force in said magnetic core after the magnetising current has disappeared.

Preferably, said contact switching member is moved from said "ON" position to said "OFF" position after a switching current of a direction or polarity opposite to said first direction or first polarity is sent through said solenoid in a direction to demagnetise said initially magnetised magnetic core.

Preferably, said first switched circuit branch of said latching circuitry includes a transistor with a common-collector connection and a transistor with a common emitter connection connecting to the two terminals of said solenoid.

Preferably, said switching demand signals include a signal with a variation of magnitude within a pre-determined period of time.

BRIEF DESCRIPTION OF THE DRAWINGS

Preferred embodiments of the present invention will be explained in further detail below by way of example and with reference to the accompanying drawings in which.

DETAILED DESCRIPTION OF THE PREFERRED EMBODIMENT

Figure 1:
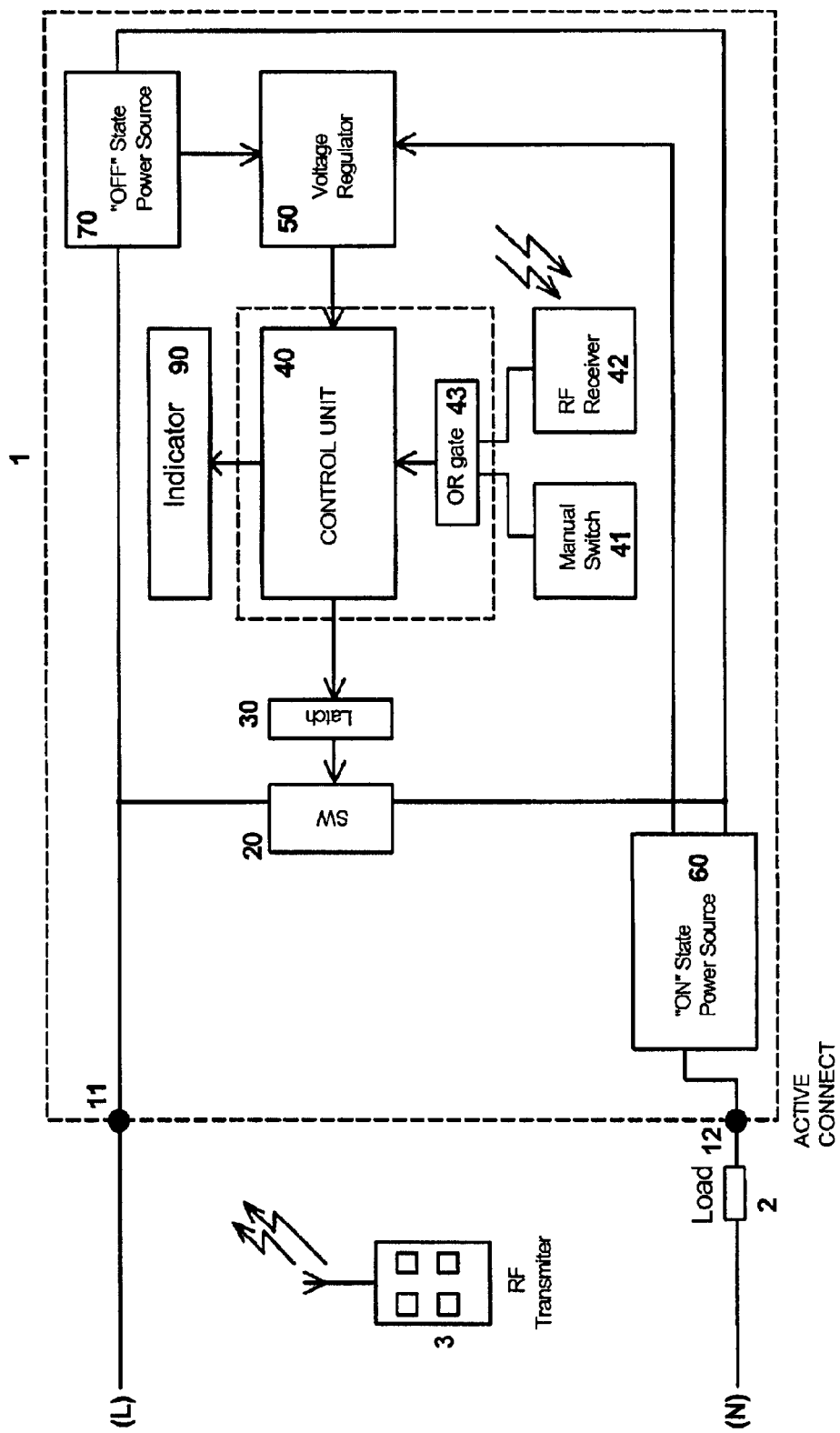
FIG. 1 is a block diagram showing the general layout of an electrical power switch of the present invention.
Figure 2:
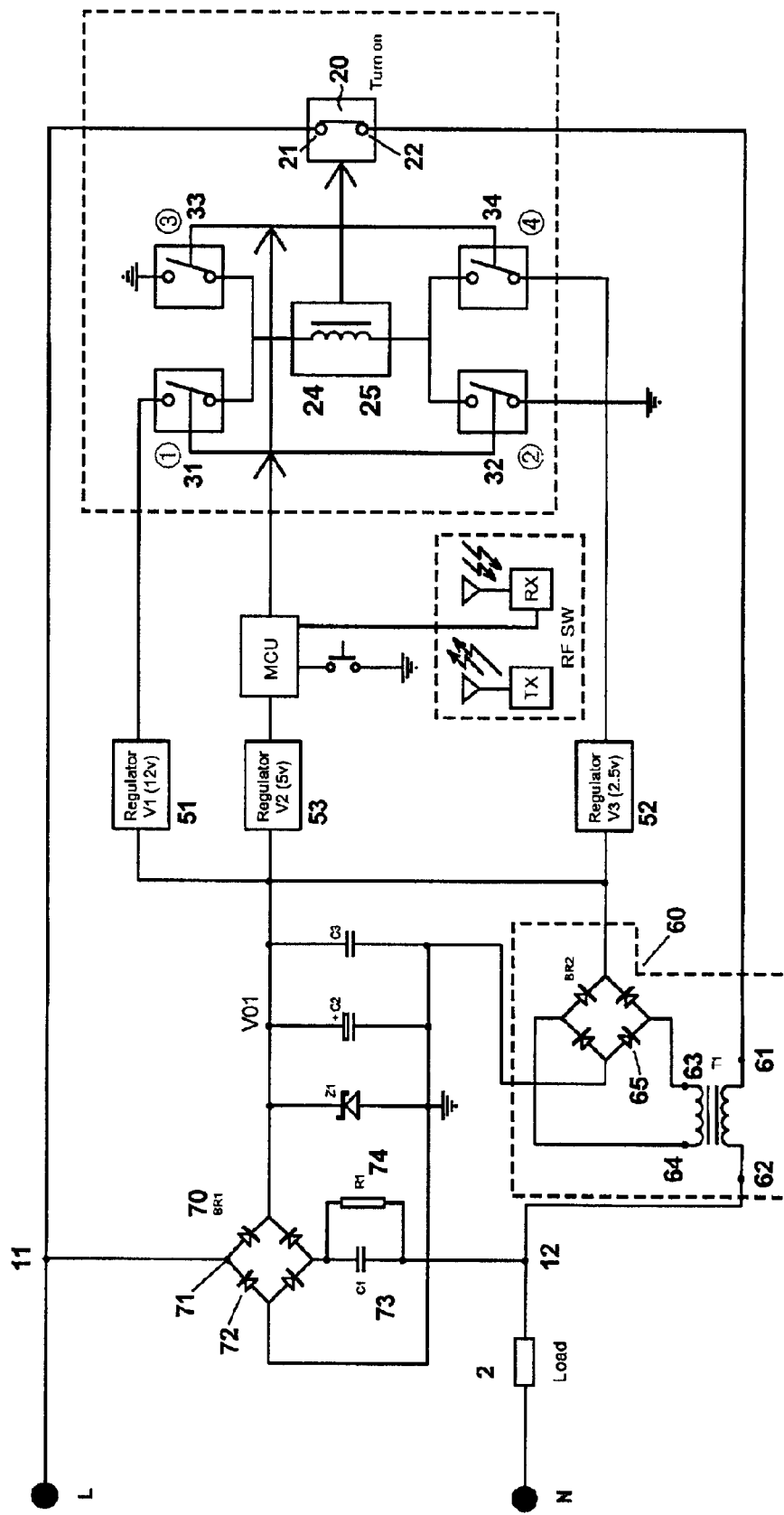
FIG. 2 is a hybrid circuit and block diagram showing a first embodiment of the power switching device in its "ON" or conductive state.

Referring firstly to FIG. 1, there is shown a schematic block diagram of a line-powered electrical switch (1) of the present invention which is generally depicted within the dotted box. The electrical power switch is generally intended to be connected to the live (L) and neutral (N) terminals of an AC power source via a load (2), which may be a lamp, or other appliances. Also included in the Figure is a remote control (3) transmitter for symbolizing that the power switch (1) can be switched on and off remotely.

Referring generally to the Figures, the electrical power switch includes a first (11) and a second (12) power terminal for external connection. In general, the terminal connections can be reversed for AC (alternating current) application without any modification. The power switch also includes a first and a second shunt circuit branches which are connected between the two power terminals (11, 12).

The first shunt circuit branch (11-21-22-12) includes a switching device (20) which is switchable between a low impedance "ON" or closed state and a high impedance "OFF" or open state. When the switching device (20) is in the "ON" state, the switch (1) is generally a low impedance device across its two terminals (11, 12). When the switching device (20) is in the "OFF" state, the switch (1) is generally a high impedance open circuit which blocks current passage for all practical purposes.

In the first shunt circuit branch (11-21-22-12) or generally in series connection with this shunt branch, there is provided a first power supply circuit (60) which is generally responsible for supplying the operating power to the switching control means (40) and other peripheral components, especially when the switching device is turned "ON". This first power supply generally obtains its source power from the current which flows in this first shunt branch and through the switching device (20). An example of a suitable component for use in the first power supply circuit to derive power from a flowing current may include a current transformer or other current transforming device connected generally in series with the switching device. A rectifying circuit as well as a voltage regulator (5) may be provided to the output of the current transformer. To minimize influence to the external load, it is desirable that the second power supply circuit has a low-input impedance so that the additional on-state voltage will not be significant, since this current transformer is generally connected in series with the switching device.

More specifically, and as shown in the Figures, the first power supply circuit (60) includes a two-terminal (61, 62) circuit member which is generally connected in series with the switching device (20) so that the current flowing through the switching device (20) will also flow through the two-terminal circuit member (61, 62) of the first power supply. The two-terminal circuit member in the present specific example corresponds to the primary windings of a current transformer and has a low impedance in general. Consequently, the input to the first power supply is responsive or correlative to the change of the current flowing through the switching device.

In the second shunt circuit branch (11, 71, 12), there is provided a second power supply circuit (70) which is predominantly responsible for supplying the operational power to the voltage regulator circuitry (50) and therefore the switching control means (40) as well as the peripheral circuitry, when the switching device is in the "OFF" state.

The second power supply circuit preferably includes a high-impedance input circuit to ensure a very low leakage current when the switch is "OFF", since this circuit is generally connected in parallel to the shunt branch containing the switching device. A low leakage current is generally necessary in order to comply with relevant electrical safety standards as well as for product safety. A second power supply circuit with a high input impedance will ensure high impedance across the two power terminals (11, 12) when the switch is "OFF". A voltage transformer, preferably a stepping-down transformer, provides a good example of a suitable front-end part to the second power supply.

The inclusion in the general power supply a first power supply of circuit, which is generally connected in series in the switching device and which has a low input impedance, and a second power supply circuit, which is generally connected in parallel to the switching device and having a high input impedance generally overcomes the aforesaid difficulty in providing power to the switching and control circuitry both during the "ON" and "OFF" STATES. Hence, the present power supply arrangements contribute to ensure that power supply is available for the control, switching and other peripheral circuitry of the power switch regardless whether the power switch is in the "ON" or the "OFF" state.

The operation of the power supply circuits will be explained in further detail by reference firstly to the "OFF" state of the switching device. When the two power terminals (11, 12) of the switch (1) are connected to an external AC power supply with the switching device in its "OFF" state, the voltage across the two power terminals (11, 12) is generally high and equal to the open-circuit voltage of the power source or mains voltage which is typically 110 volt in the USA and 220 volt for Europe. In this "OFF" state, leakage electrical power can be obtained by coupling the input terminals of second power supply (that is, the primary windings of the voltage transformer) to the power source. Because of the large potential difference across the switch terminals (11, 12), a relatively large and significant usable power can be obtained from the AC power source with a relative small leakage current, for example, in the magnitude of 20 mA or less. Such a small leakage current already provides abundant power output at the second power supply (that is, the output terminals of the voltage transformer) for general electronic control or switching circuitry without exceeding the acceptable leakage current limits. On the other hand, since no, or only a minimal, current flows through the switching device at its "OFF" state, and since the input to the first power supply circuitry (that is, the current transformer) is correlative to the switching device current, the power that can be derived from the first supply during this "OFF" state is minimal.

When the switching device (20) is in the "ON" state, because of the inherently low-impedance characteristics of the switching device (20) at this state, the potential difference across the switching terminals will be very low. Since the second power supply includes a high-impedance input circuitry, the instantaneous voltage drop across the input of this second power supply circuit will be small during the "ON", state. Consequently, the power which may be obtained or available from the second power supply during this "ON" state will be minimal or negligible.

In order to provide operating power to the switching control or other peripheral circuitry when the switching device (20) is in its "ON" state, the first power supply circuit, which generally obtains its power from the current flowing through the switching device (20), is provided. This first power supply circuit (60) generally includes a low input impedance circuitry and is generally connected in series with the switching device (20). Since when the switch is "ON", the potential difference across the switching terminals will be minimal or negligible but the current will usually be very observable, and therefore electrical power can be tapped from the current flowing through the switching device while the potential drop across the switching device is negligible due to a necessarily low switching-on impedance.

The switching device (20) is generally controlled and driven by a latching circuit (30) which is in turn controlled by a controller unit (40) such as a microprocessor. A visual indicator (90) is preferably included for user interface so that a user can be informed of the instantaneous switching state of the power switch (1). Since electrical power is required to operate the switching device (20), for example, to open or to close the switch, the control circuitry (which includes the latching circuit (30) in the present preferred example), the controller unit (40) and indicators, and, since DC is generally required, a common voltage regulating circuitry (50) is generally connected to the first and second power supply circuits (60, 70) to maintain a constant DC voltage level regardless of the switching states of the switching device (20).

Furthermore, since different components in the circuitry may require different voltage levels, the voltage regulating circuitry (50) may include a plurality of voltage regulators or a combination of voltage regulators with potential dividers to supply the various DC voltage levels.

In order to control the actual or physical switching of the electronic or electro-mechanical switching device, the controller unit (40) sends out a switching signal to the control circuitry (40) to trigger or actuate the actual opening or closing of the switching device (20) upon detection of the switching signals.

In order to be remotely controllable so that a load can be switched on or off from a distance for enhanced user friendliness, the switching controller is also connected to a remote control signal receiver (42) so that, upon detection of a remotely transmitted switching signal, the signal receiver can notify the controller unit (40) which will in turn send out switching instructions to the control circuitry, thereby changing the switching states of the switching device (20).

Furthermore, in order to accommodate local switching option, a soft-touch button (41) is also connected to the controller (40). The soft-touch button may be, for example, provided on the wall-plate surface of the switch. The soft-touch switch may, for example, include a membrane or spring-biased switching device which sends an electrical signal to the controller unit (40) when its terminal contacts are pressed into conductive engagement.

When soft-touch switching is actuated, the controller unit (40) sends out switching signals whenever switching instructions are detected at the designated soft-touch buttons (41). To avoid erroneous detection or interpretation of switching commands, signals indicating or corresponding to a change or transition of state are selected as preferred switching instruction so that prolonged, extended or un-interrupted pressing of the soft-touch button will not be interpreted by the controller as repeated or multiple switching requests. These switching instructions can, for example, be obtained by a constant or regular monitoring of the soft-touch button (41) by the controller unit (40) to detect for a change or a transition in the actual or physical change or transition if the switching states. As an example, a switching instruction can be given out by the controller when an edge transition signal is given out by the soft-button as a result of a press-and-release or a soft-touch action.

This design is beneficial to avoid undesirably repetitive toggle switching, for example, by a toddler pressing his finger continuously on the soft-touch button or due to adverse engagement the soft-touch button by an object.

Of course, it will be noted that while a soft-touch button appears to be a switching device to a user, it does not actually do the switching and is merely a sensor or detector for transmitting a switching signal to the micro-controller unit (40). The micro-controller (40) or the microprocessor unit then sends switching signal to the switch actuator or the switching control.

In some circumstances, the soft-touch button may be continuously pressed while a genuine switching signal is also transmitted by the remote controller to the micro-controller at the same time. To avoid the genuine switching signals from being shielded or hidden by the false signals, the signals originating from the various detectors or sensors are preferably conjunctively combined so that the control unit will cause a change of switching state whenever a genuine switching signal is detected, even though a false switching signal is present. In order to accommodate the various sources of switching signals, a conjunctive decision circuitry such as an "OR" gate (43) may be placed intermediate between the input port of the controller unit and the switching signal sources to cause switching.

Referring to FIGS. 2–9, a specific circuitry embodiment of the power switch of the present invention will be illustrated by way of hybrid block and component diagrams. In this embodiment, the second power supply includes a series connection of a bridge rectifier (72) and a high impedance link which includes a capacitor (73) and a resistor (74). This series connection is connected across the switch terminals (11, 12) so that when the switch (1) is connected in series with the load (2) and the alternating power source, the open-circuit voltage of the power source will appear across the switch terminals (11, 12). Due to the high input impedance, an acceptable level of leakage current will flow into the high impedance link and the resulting DC power will be delivered to the voltage regulating means (50) via the rectifying circuit.

The first power supply includes a current transformer having primary (61, 62) and secondary (63, 64) windings. The primary windings (61, 62) are connected in series with the switching device (20). In operation, most if not all, of the current which flows through the switching device will also flow through the primary windings. Because of the inherently low impedance of the primary windings of a current transformer, the voltage drop across the primary windings are minimal and the overall effect to the load will be negligible. The secondary windings (63, 64) of the current transformer are connected to the inputs of a bridge rectifying circuit (65). Similarly, the output of the bridge rectifying circuit is connected to the input of the voltage regulating circuitry.

The switching device (20) in the first shunt circuit branch (11-20-12) includes an electromechanical relay switch (20). The relay switch (20) includes a conductive contact switching member which is magnetically coupled or connected to a solenoid based circuitry. The magnetic coupled switching member includes a polarised or magnetised magnetic member so that it will move into or out of a conductive engagement, depending on the direction of the magnetic force generated by the solenoid. To generate magnetic flux of opposite polarities, the solenoid is generally connected to a latched relay circuit shown in more detail in FIGS. 7 and 8. In the present embodiment, a four-terminal latch relay circuit including four switching elements (31–34) is used and shown in the dotted box of FIGS. 2–4.

In order to provide a compact power switch of the above-description so that the switch can be fitted in a small and confined space such as a wall cavity for a standard wall-mounted power switch, it is highly desirable that the switching device can be actuated and changed from the "ON" state to the "OFF" state or vice versa with a small actuating current and that only very minimal or no current is required to maintain the switching device in its non-transitional operating states. This is desirable since the current required for switching and maintaining the switch will determine the size of the current transformer and have the overall switch size. It will be appreciated that a small current requirement means lesser current transformer windings and hence a smaller physical size.

Figure 9:
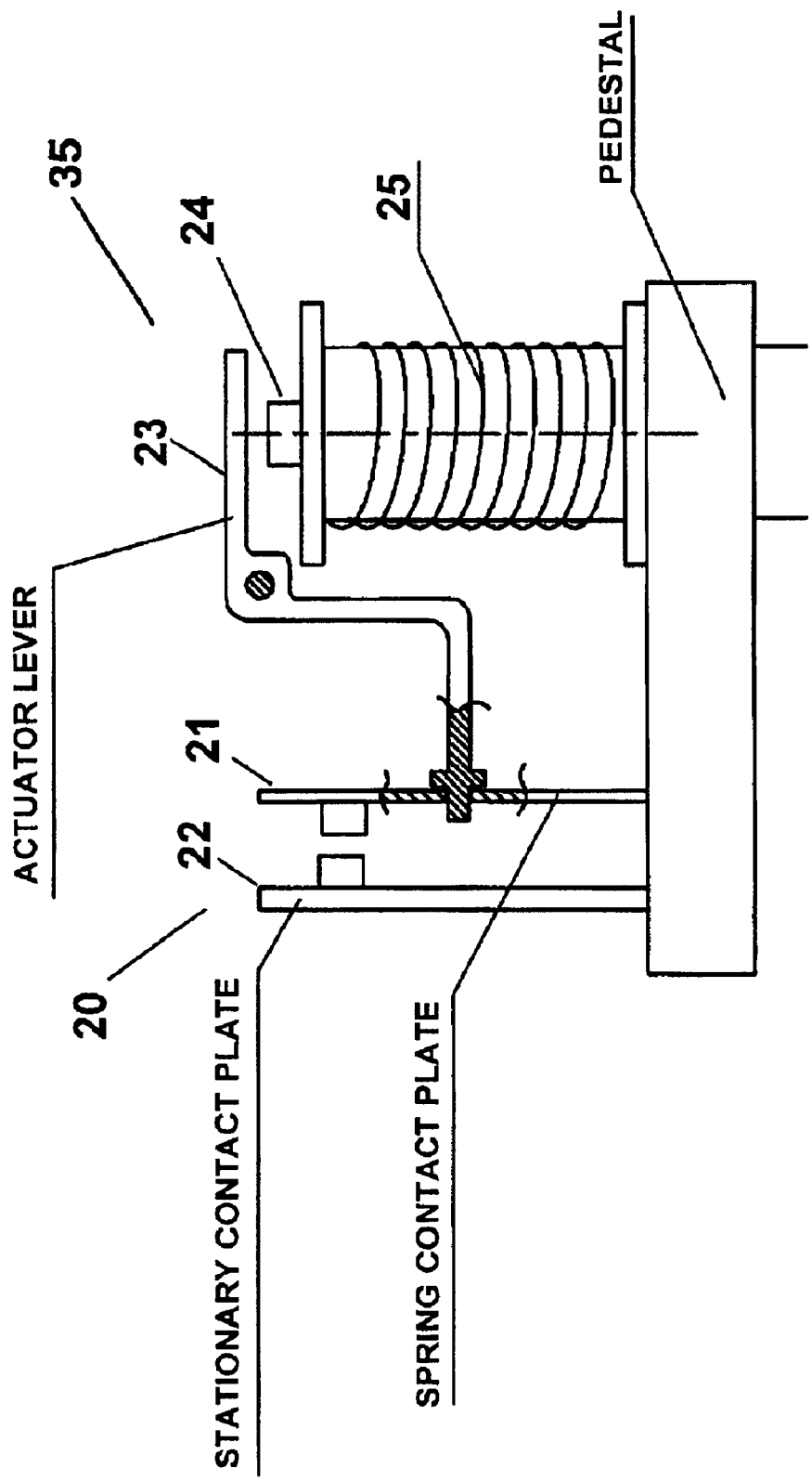
FIG. 9 illustrates the structure of an example of an electromechanical switching device suitable for use in the embodiment of FIG. 2.

In order to achieve the aforesaid requirements, a preferred electromechanical switch (35) as shown in FIG. 9 is used as an example. The relay switch (35) includes a first and a second switch contact terminals (21, 22) made of a conductive material, a mechanical actuation lever (23) and a magnetic core (24) with solenoid (25) windings which are wound above the magnetic core. The relay is preferably designed so that the current required for switching can be kept to a minimum and no or only a minimal current is needed during non-transitional states, that is, when the switch is either at its "ON" or "OFF" states. By selecting a magnetic core of a suitable material, the magnetic core can maintain a high residual magnetic force after being magnetized while a small reverse solenoid current can be used to demagnetize the magnetic core.

When a current of a first polarity is applied to the solenoid (25), the magnetic core (24) will be magnetized and an attractive force will be generated between the magnetic core (24) and the actuator lever (23). This attractive force will drive the spring contact plate (21) (or the contact switching member) to move left and close the two contact terminals, thereby switching the relay switches from "OFF" to "ON".

When the switch is in the "ON" state, no solenoid current is needed to maintain close contact between the two terminals because the residual magnetic force in the core (24) will be large enough to resist the resilient bias of the spring contact plate. Thus, the "ON" status can be maintained without continuous current supply. When a solenoid current of a reverse polarity is applied, the magnetic core will be demagnetised, at least to some extent. The magnetic core is designed so that the residual attractive force between magnetic core (24) and actuator lever (23), if any, will not be sufficient to maintain electrical contact between the two contact terminals. As a result, the spring contact plate will deflect and separate from the stationary contact plate (22) under its own spring bias force, thereby switching the relay switch from "ON" to "OFF". Likewise, the "OFF" status can be maintained without solenoid current as this is the at rest or equilibrium position of the contact plate.

Since the switching operation of both turning "ON" and turning "OFF" only needs a pulse or a short duration of solenoid current, the average current requirement can be kept to a minimum.

Referring to the Figures and with particular reference to the latching circuit described within the dotted box, when the switching elements (31) and (32) are closed, a DC current of a first polarity will flow from the voltage regulating source (51) to the switching elements (31) and (32) and generate a magnetic force of a first polarity.

On the other hand, when switching elements (33) and (34) are closed, a direct current of the opposite polarity will flow from the voltage regulator (52) into the switching element (34), through the solenoid and into the switching element (33), thereby demagnetising the magnetic core. The latch switching elements (31, 32, 33 and 34) and the solenoid are arranged in the present example so that when a current of a first polarity flows from the switching element (31) through the solenoid (25) to the switching element (32), a magnetic force which is large enough to attract the magnetic member on the switching device to a close-circuit configuration will be produced. This magnetic force will have a residual magnetisation in the magnetic core after the transient magnetising current has disappeared.

On the other hand, when current flows from the voltage regulator (52) to the switching element (34), through the solenoid and then into the switching element (33) into ground, the magnetic core will be demagnetised. Consequently, the attractive force which holds the magnetic core (24) and the actuator lever (23) together will be diminished or disappear. As a result, the spring biased contact plate (21) (or the contact switching member) will depart or separate from the contact with the stationary plate (22) due to its own spring biasing. An example circuitry which will perform the functions of a latch relay suitable for use in connection with a solenoid circuit is shown in FIG. 9 and detailed explanation of the relevant circuitry will be described below in this specification.

In this embodiment, a relay switch mechanism which can be switched "ON" or "OFF" respectively by magnetizing and demagnetizing the solenoid core has been utilized. Of course, the "ON" and "OFF" switching can also be achieved respectively by demagnetizing and magnetizing the solenoid core with suitable modifications. In general, magnetic fluxes of the opposite polarities are used to cause "ON" or "OFF". This present relay switch provides a specific example of a switching device or mechanism which requires different energy for switching "ON" and "OFF". Specifically, the relay of the present example requires more energy to switch on and less energy to switch off since it will be appreciated that more energy will be required to pull the electrical contacts together while less energy is required to separate the electrical contacts since they are under spring bias urge when in contact.

A non-symmetrical switching mechanism is preferred in the present application since it is highly desirable that the main switch can be turned off at any instant after being switched on for practical convenience and since it is observed that the accumulation of electrical energy during the "ON" state of the switch, which is required for turning off, will be much slower than that accumulated during the "OFF" state of the switch for turning on. This non-symmetrical rate of energy accumulation occurs because when the switch is "ON", the additional on-state voltage across the switching terminals (21, 22) must necessarily be low and since a compact or small sized current transformer is required in order to ensure a compact switch, the rate of energy accumulation must be slow.

On the other hand, when the switch is "OFF", the second power supply is under a relatively high voltage of between 100–250V and the rate of accumulation of energy is therefore more rapid. By employing a non-symmetrical switching mechanism of the type described, it is possible to ensure compactness as well as responsive switching. Of course, for switches which are not subject to size or responsive time restraint, other switching mechanism may be employed.

Figure 8:
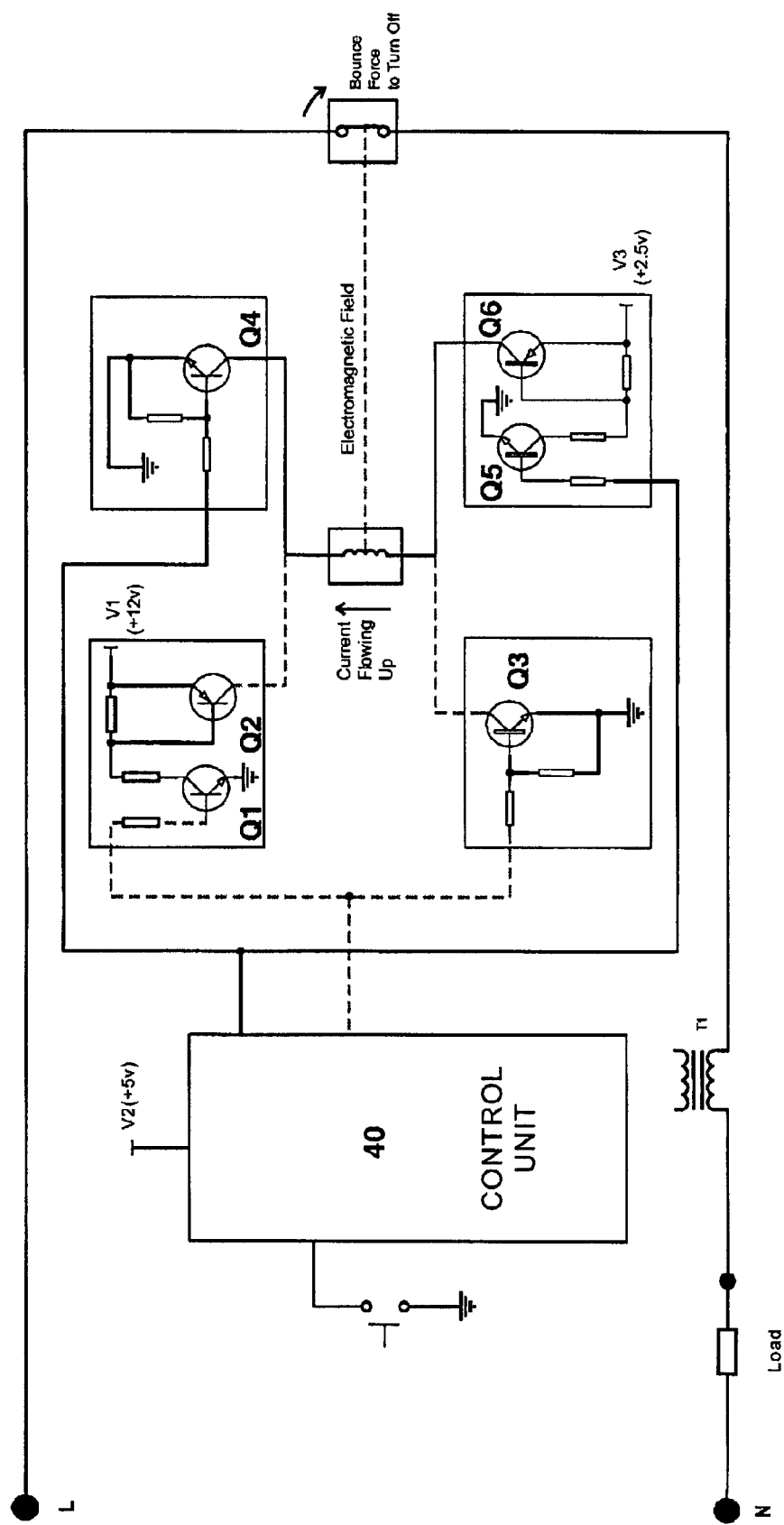
FIG. 8 is a hybrid block and circuit diagram illustrating the operation of the controller and the latching circuit of FIG. 2 to turn off the power switching device.

An exemplary circuit which may be used to provide switching or reversible currents for activating, this is, latching and unlatching, a switching mechanism polarities by magnetizing and demagnetizing a magnetic core is shown in FIGS. 8 and 9. Referring to FIG. 8, when the CPU port connecting to the assembly of transistors Q1, Q2 and Q3 is at a high voltage level and that connecting to the assembly Q4, Q5 and Q6 is pulled low, transistors Q2 and Q3 will be conducting through the solenoid 25, thereby generating a magnetic flux and force of a first direction for magnetizing the core. On the other hand, and as shown in FIG. 9, when the CPU port connecting to transistors Q4, Q5 and Q6 is pulled high, transistors Q4 and Q6 will be conducting, thereby providing a current of an opposite polarity to nullify, at least to some extent, the effect of the current of the opposite polarity. This latching circuitry provides a simple and efficient means for activating and deactivating the switching mechanism which can be made either as an IC or using discrete components.

As mentioned above, it may be preferable that the main switching device (20) can be turned off more easily by using a relay which requires less energy to turn off than turn on. To support this type of non-symmetrical switch, it will be appreciated that the current source associated with switching of may be biased at a lower voltage level, for example, 2.5V, in the present case.

Turning now to the first power supply which is included to provide operating power when the main switching device (20) is in its "ON" state, the power supply includes a rectifying bridge having its two input terminals connected to the secondary windings of a current transformer. The terminals of the primary winding of the current transformer are connected in series with the main switching device (20) so that the same current will flow through the main switching device (20) and the primary windings of the current transformer when the main switching device is in its "ON" state.

The output of the rectifying bridge is connected to the input of voltage regulating circuitry which includes voltage regulators of different voltage level, for example, 12 volt, 5 volt and 2.5 volt, for the various circuit requirements.

In the present preferred example of a latching relay circuit, it will be noted that the voltage to be applied across the solenoid for switching in the main switching device is significantly higher than that for turning off the switching device. This non-symmetrical latch switching mechanism is selected so that a smaller energy can be used to turn off the switching device. This is preferred because, in general, only a small trickle current is available to charge up a power storage device in order to ensure a continuous supply of power to the voltage regulating circuitries. In order to ensure that sufficient energy is available to the solenoid to turn off the switching device even though the switch may have just recently been closed, a switching device which can be turned off with a minimal energy is highly desirable.

The voltage regulating circuitry is connected to a power storage device which includes a parallel connection of capacitors and voltage limiting devices such as a Zener diode as shown in the Figures. The Zener diode clamps the maximum voltage to 18 volt in order to protect the voltage regulators. A small capacitor is connected in parallel to the larger capacitors for suppressing high frequency interference.

The second power supply circuit includes a serial connection of a rectifying bridge and impedance branch across the two power terminals. The output of the rectifying bridge is connected to the same power storage and clamping device and to the voltage regulating circuitry for supplying DC power to the control and switching circuitry.

Figure 3:
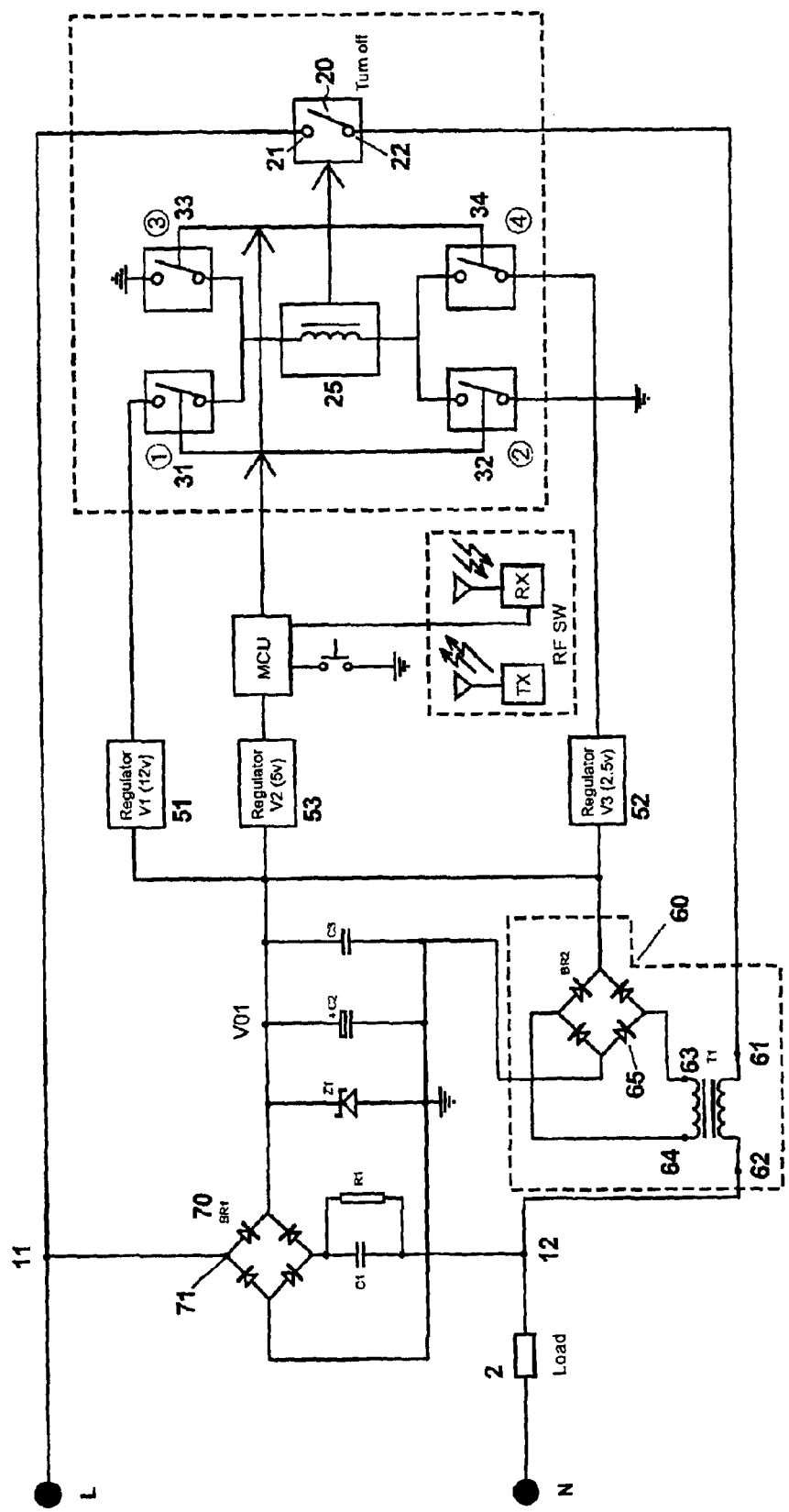
FIG. 3 is a hybrid circuit and block diagram illustrating the circuit of FIG. 2 when the switching device is in the "OFF" state.
Figure 4:
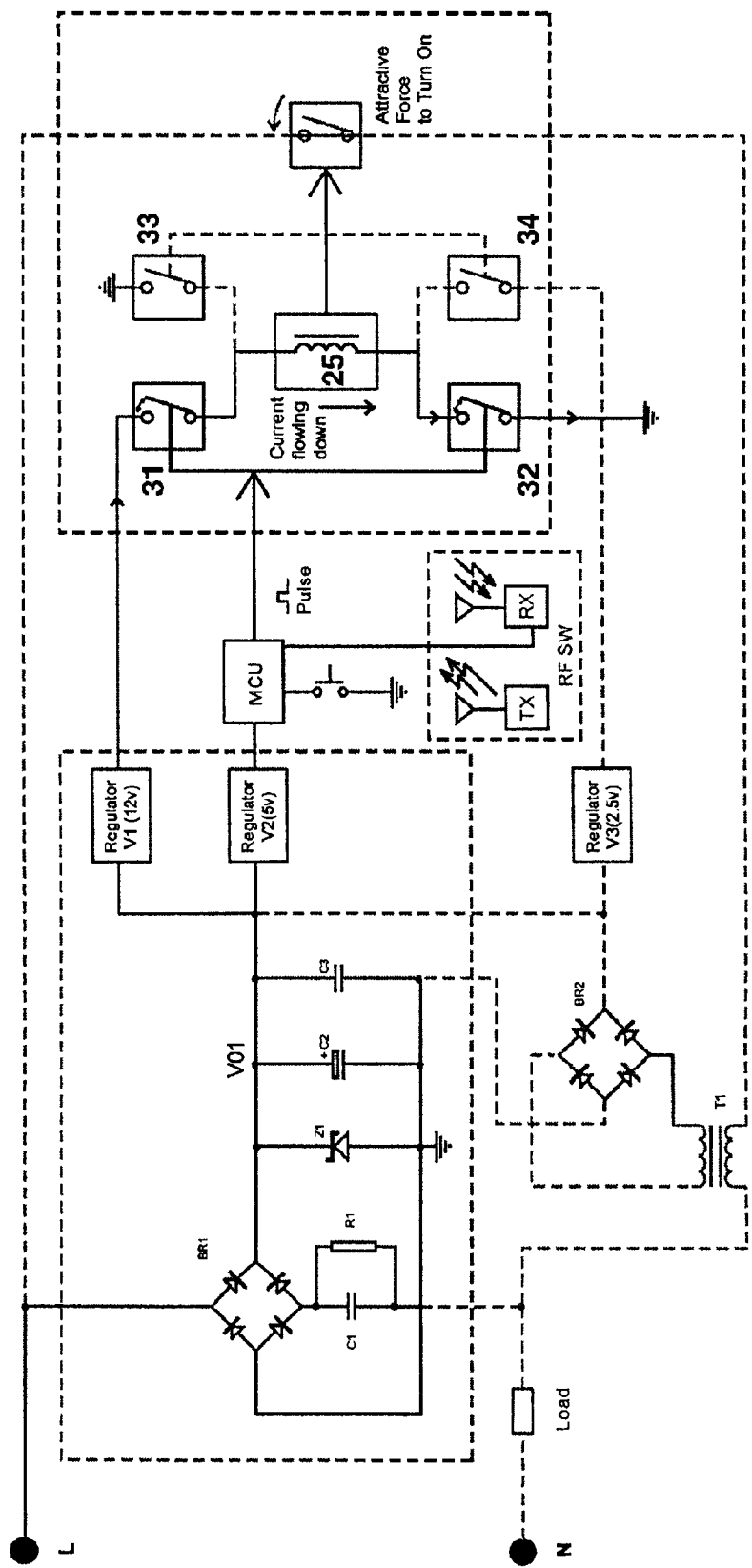
FIG. 4 is a hybrid block and circuit diagram illustrating the operation of the circuitry at the instant when the switching device is being turned from the "OFF" to the "ON" state.

The operation of the power switch switchings will now be explained in further details. Referring to FIG. 3, main the switching device (20) is in the "OFF" state and is to be turned on. When the switching device (20) is in its "OFF" state, a large voltage difference which is substantially equal to the voltage of the power source will appear across the input terminals of the second power supply. The alternating voltage appearing across the two power terminals of the switch (20) will be converted into a direct current power supply for feeding the voltage regulator which in turn will fit the power requirements of controller unit, the control circuitry and the switching device (20). In order to close the switch (20), a switching signal is transmitted by a remote-control to the receiver or by the "soft-touch" button which is connected to the controller unit. Upon detection of the switching signal, for example, by detecting an edge transitioned signal, the controller unit will cause the latch switching elements (31) and (32) to be closed. At this time, a direct current will flow from the regulator (51) through the solenoid (25) and into the latching circuit (20). The resulting magnetic force generated by this DC current flowing through the solenoid will cause the main switching device (20) to be closed.

Figure 5:
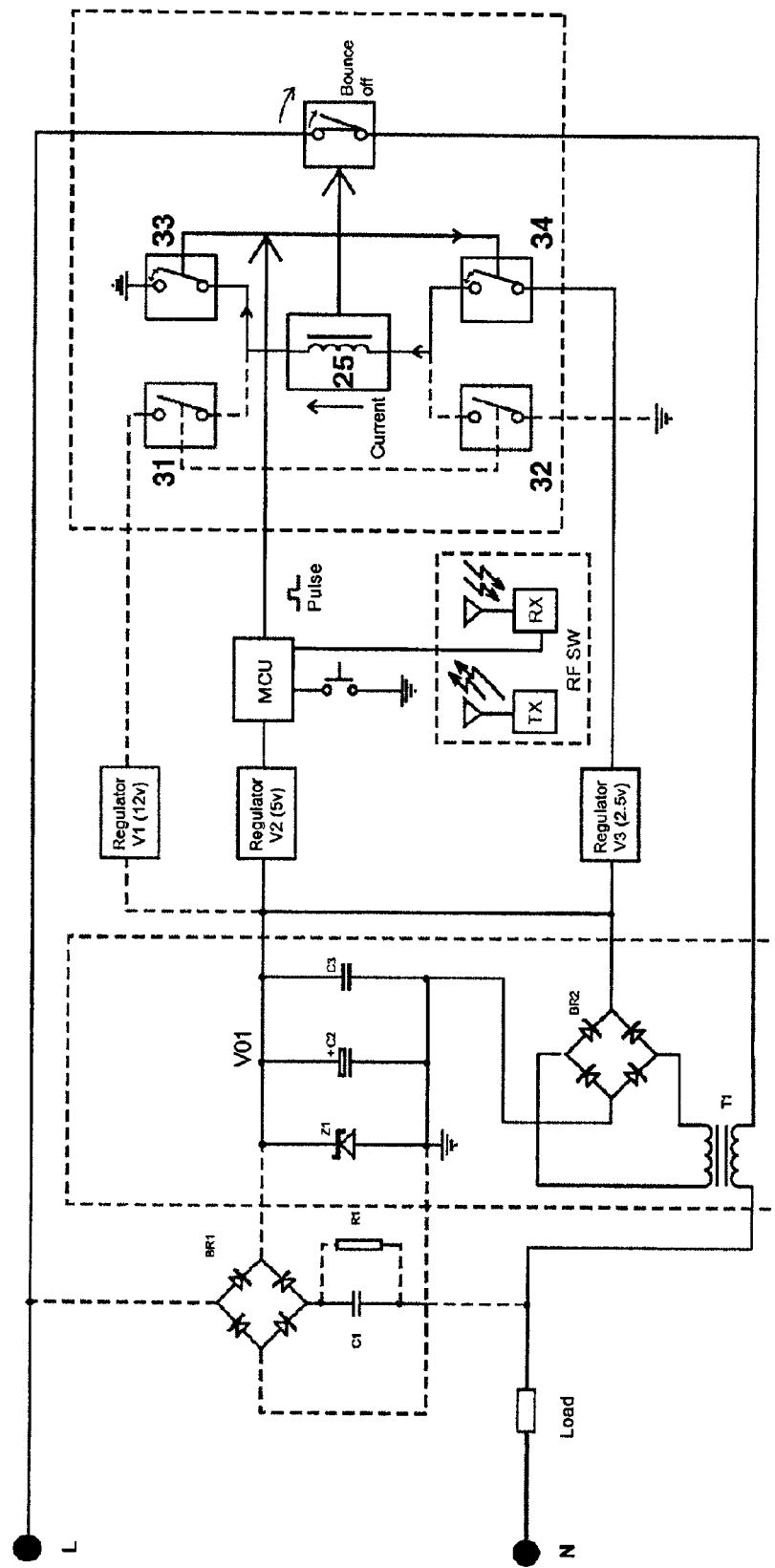
FIG. 5 is a hybrid block and circuit diagram illustrating the operation of the circuitry at the instant when the power switch is being turned from the "ON" to the "OFF" state.
Figure 6:
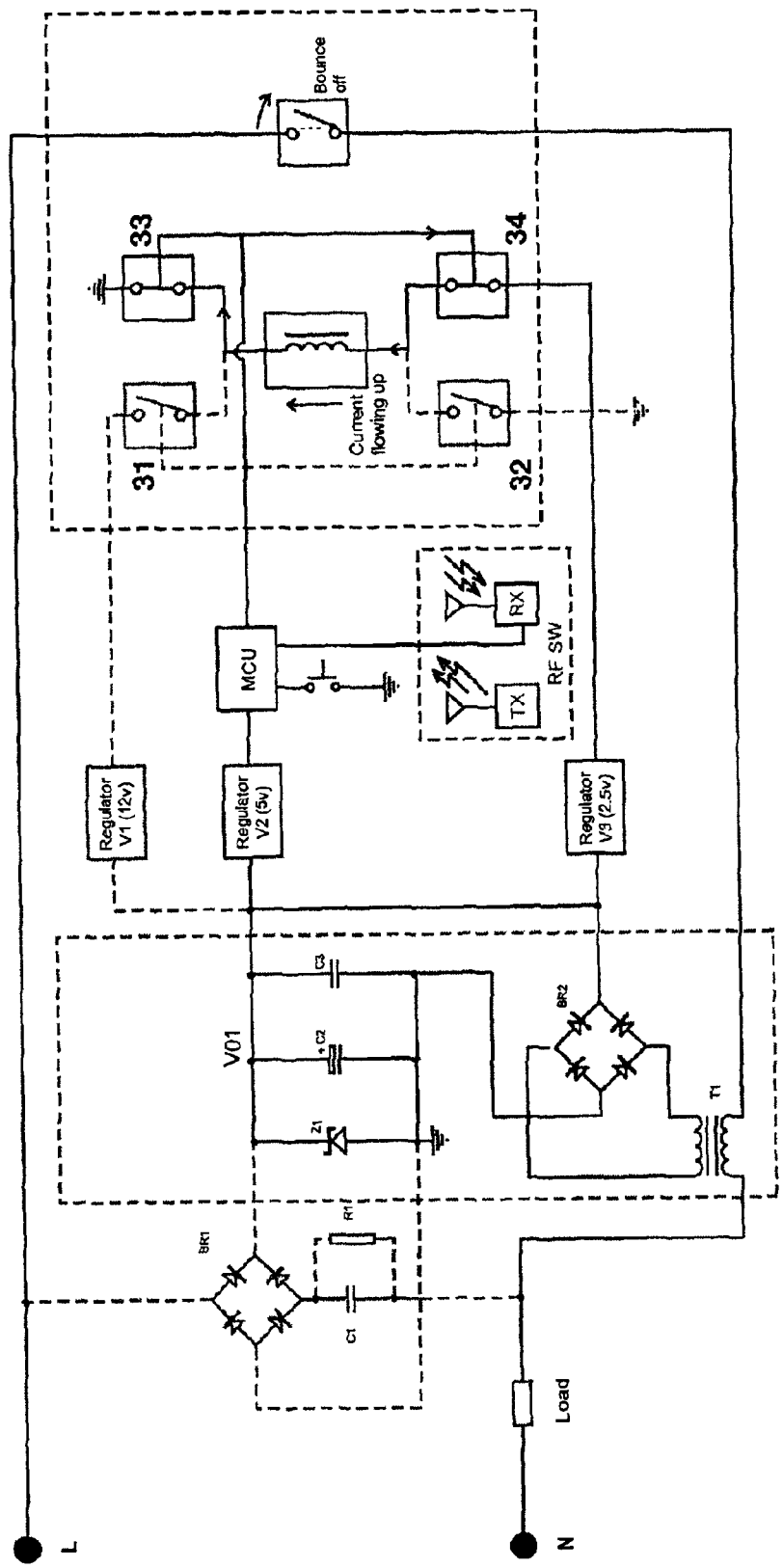
FIG. 6 is a hybrid circuit and block diagram showing the circuitry of FIG. 2 at the instant when the power switching device is turned from the "ON" to the "OFF" state.
Figure 7:
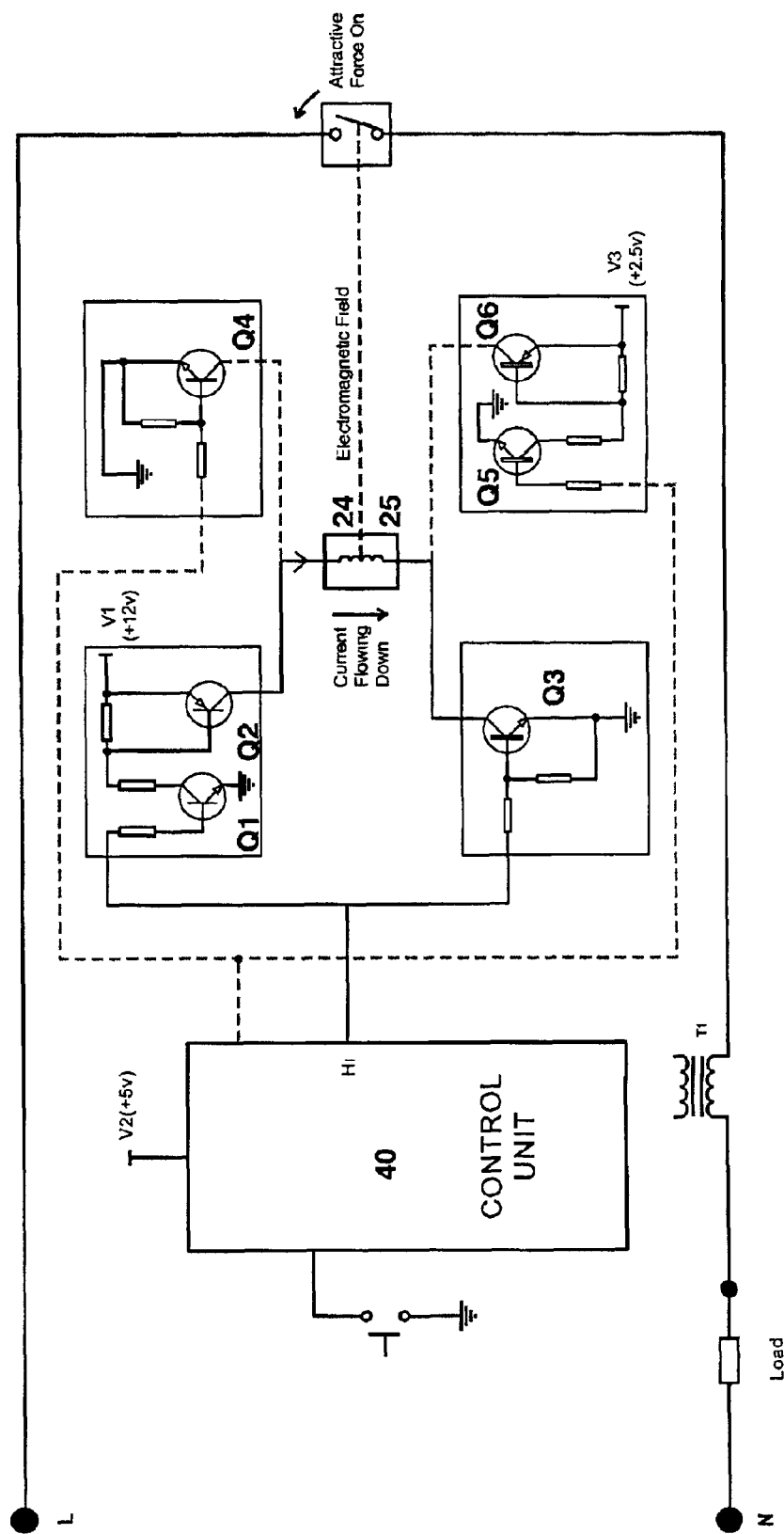
FIG. 7 is a hybrid block and circuit diagram illustrating the operation of the controller and the latching circuit of FIG. 2 to turn on the power switching device.

Turning now to FIG. 5, the switching device as shown is already in the "ON" position and is to be turned "OFF". At this instant, since the power switch is generally a low-impedance device when it is in the "ON" state, the voltage across the second power supply will be very low. No observable power can be obtained from the second power supply circuit.

On the other hand, a significant current will flow through the switching device as well as through the primary windings of the current transformer when the switch is "ON". Since the rectifying bridge of the first power supply circuit is connected to the secondary winding of the current transformer, electrical energy is coupled from the current flowing in the primary winding into the rectifying bridge and then to the power clamping and storage circuitry.

Referring to FIG. 1, when the controller detects switching signals from the remote control, the controller will send controlling signals to close the latch switching elements (33) and (34), thereby completing a current loop including the voltage regulator (52), the switching element (34), the solenoid (25) and the switching element (32). Since this direct current has a polarity opposite to the current which flowed in latch switching elements (31) and (32), the magnetic core will be demagnetized and this will cause the switching device (20) to bounce off from the "ON" position. Once the main switching device is moved out of the conductive configuration, the power switch will become non-conducting and the second power supply circuit will again be put into dominant operation and supply power to the power storage and voltage clamping unit.

In addition to switching by remote control, a local switching sensor button is also connected to the controller unit. This local switch-sensing button is for example a soft-touch membrane or spring biased switch which will send signals to the controller unit when pushed. Upon detection of such signals, the controller will send controlling signals to the latch relay circuit to establish the relevant current path in order to open or to close the switching device.

While the present invention has been explained by reference to the preferred embodiments described above, it shall be appreciated that the present invention can be realised by employing circuitry or circuit components which provide equivalent functions and operate on different parametric values without departing from the scope and the spirit of the present invention. The specific circuit embodiments described herein are merely provided to assist understanding and appreciation of the scope and nature of the present invention and does not intend to be restrictive. For example, while two rectifying bridges have been illustrated in the present preferred embodiments respectively for use in the first and second power supply circuits, it will be readily appreciated by persons skilled in the art that a single rectifying bridge with appropriate inductive coupling from the respective power sources can also be employed. Furthermore, while a relay of a particular design has been explained, it will be appreciated that other similar or equivalent relay members can be used without loss of generality. Furthermore, while the present latch relay circuit has been explained by reference to specific latch relay and other circuitry, it shall be appreciated that other ways of realising latch relay or other circuits can also be employed without loss of generality. In summary, the invention has disclosed a useful power switch with line powered control and switching circuitry which can have wide applications.

What is claimed is:

1. An electrical power switch including a first terminal, a second terminal, a switching device connecting said first and said second terminals, switching control means for operating and controlling said switching device, and power supply circuitry connected to said first and said second terminals for supplying power to said switching control means, said power supply circuitry includes a voltage transforming means and a current transforming means, said voltage transforming means includes an input circuit of high impedance connected in a circuit branch which is generally parallel to the branch containing said switching device, said current transforming means includes an input circuit of low impedance which is serially connected with said switching device between said first and second terminals, wherein said switching device includes a solenoid operated contact switching member, said contact switching member being movable between a circuit-closing position (the "ON" position) and a circuit-opening position (the "OFF" position), said contact switching member remains in either said circuit-closing or said circuit-opening positions unless and until a switching current is sent through said solenoid to switch said contact switching member from said circuit-closing position ("ON" position) to said circuit-opening ("OFF") position or from said circuit-opening ("OFF") position to said circuit-closing ("ON") position.

2. A switch according to claim 1, wherein said switching current to switch said contact switching member from said "OFF" position to said "ON" position has a direction or polarity which is opposite to that for switching said contact switching member from said "ON" position to said "OFF" position.

3. A switch according to claim 1, wherein said contact switching member is held in said "ON" position by a magnetic core after a switching current of a first direction or polarity has been sent through said solenoid to magnetised said magnetic core.

4. A switch according to claim 3, wherein said contact switching member is moved from said "ON" position to said "OFF" position after a switching current of a direction or polarity opposite to said first direction or first polarity is sent through said solenoid in a direction to demagnetise said initially magnetised magnetic core.

5. A switch according to claim 1, wherein the energy required to switch said contact switching member from said "ON" position to said "OFF" position is lesser than that required to switch said contact switching member from said "OFF" to said "ON" position.

6. A switch according to claim 1, wherein said solenoid is connected to said switching control means via latching circuitry, said latching circuitry includes a first switched circuit branch connected to a first voltage source for switching "ON" said switching device and a second switched circuit branch connected to a second voltage source, for switching off said switching device, the voltage of said first voltage source being higher than that of said second voltage source.

7. A switch according to claim 6, wherein said first switched circuit branch of said latching circuitry includes a transistor with a common-collector connection and a transistor with a common emitter connection connecting to the two terminals of said solenoid.

8. A switch according to claim 1, wherein said contact switching member is moved against spring urge when moving from said "OFF" position to said "ON" position and said contact switching member moves with spring assistance when moving from said "ON" position to said "OFF" position.

9. A switch according to claim 1, wherein said switching control means sends currents of opposition directions or polarities through said solenoid for switching on and off said switching device.

10. A switch according to claim 1, wherein said switching control means is connected to a signal receiver for receiving remote control signals, said signal receiver is operated by power obtained from said power supply circuitry.

11. A switch according to claim 1, wherein said switching control means is connected to a local control and a remote control receiver, said switching control means sends out signals to operate said switching device upon detection of switching demand signals from either said local control or said remote control.

12. A switch according to claim 11, wherein said switching demand signals include a signal with a variation of magnitude within a pre-determined period of time.

13. A switch according to claim 1, wherein said switching control means is connected to at least a first and a second switching signal sensors which hare conjunctively connected, said switching control means sends out switching signals to operate said switching device upon detection of a switching demand signal from any of said sensors.

14. A switch according to claim 1, wherein said contact switching member is brought into the "ON" position by magnetising a magnetic core which hold said contact switching member in its "ON" position by the residual magnetic force in said magnetic core after the magnetising current has disappeared.

* * * * *

UNITED STATES PATENT AND TRADEMARK OFFICE
CERTIFICATE OF CORRECTION

PATENT NO. : 6,819,014 B2  Page 1 of 1
APPLICATION NO. : 10/102804
DATED : November 16, 2004
INVENTOR(S) : Chung Ping Kevin Lo et al.

It is certified that error appears in the above-identified patent and that said Letters Patent is hereby corrected as shown below:

On the title page Item 75 (Inventors): add --Michael Dean Smith--

Signed and Sealed this

Nineteenth Day of December, 2006

JON W. DUDAS
*Director of the United States Patent and Trademark Office*